United States Patent [19]

Hicks

[11] Patent Number: 4,761,763
[45] Date of Patent: Aug. 2, 1988

[54] RATE ADAPTATION CIRCUIT AND METHOD FOR ASYNCHRONOUS DATA ON DIGITAL NETWORKS

[75] Inventor: Gregory F. Hicks, Nepean, Canada
[73] Assignee: Northern Telecom Limited, Quebec, Canada
[21] Appl. No.: 780,367
[22] Filed: Sep. 24, 1985
[30] Foreign Application Priority Data
 Jun. 28, 1985 [CA] Canada ............................. 485968
[51] Int. Cl.⁴ ........................................ G06F 13/00
[52] U.S. Cl. .................................................. 364/900
[58] Field of Search ... 364/200 MS File, 900 MS File; 375/7, 8

[56] References Cited
U.S. PATENT DOCUMENTS 3,728,683 4/1973 Biegert et al. .................... 364/900
3,775,751 11/1973 Anderson ........................... 364/200
3,781,818 12/1973 Pardoe et al. ..................... 364/900
4,156,931 5/1979 Adelman et al. ................... 364/900

Primary Examiner—Thomas M. Heckler
Attorney, Agent, or Firm—F. P. Turpin

[57] ABSTRACT

The invention provides a data unit for the rate adaptation to overspeed data in fully digital systems adapted to the transmission of block mode asynchronous data. The data unit comprises an interface circuit for receiving data from a transmission facility, a universal asynchronous receive transmit circuit (UART) for interfacing to data terminal equipment, a dynamically adjustable baud rate generator for driving the UART, and a microprocessor for controlling the transfer of data from the transmission facility to the output of the UART. Upon detection of overspeed data being received, the frequency of the baud rate generator is increased for the remainder of the byte being processed in the UART. The baud rate generator is reset to its nominal frequency at the boundary of each byte outputted from the data unit.

13 Claims, 3 Drawing Sheets

RATE ADAPTATION CIRCUIT AND METHOD FOR ASYNCHRONOUS DATA ON DIGITAL NETWORKS

The invention relates generally to data transmission systems and more particularly to a circuit and method for providing rate adaptation of asynchronous data on digital networks.

As is generally well known, data may be transmitted on a facility between two points using synchronous or asynchronous modes of transmission. In the synchronous mode, a clock signal is transmitted with or is inherent in the data to maintain the transmitter and receiver in continuous synchronization. In the asynchronous mode, there is no signal within the character format that conveys the timing between transmitter and receiver for each bit of the data. Instead, a start bit is used as a synchronizing signal by the transmitter and the receiver for each character. Each byte or character also ends with a stop bit that delimits the boundary of each byte from its neighbour.

Asynchronous operation requires that the transmitter and the receiver maintain within themselves free-running clocks with the same nominal frequency which is accurate to within certain tolerances which usually depends on the maximum data rate to be transmitted. The continuous transmission of asynchronous data frames, with each stop bit followed immediately by the start bit of a new byte frame is termed block mode transmission.

The reception of asynchronous data at a receiver is achieved by detecting the beginning of a start bit, waiting to the mid-point of the start bit and then starting a sampling clock which corresponds to the transmission speed of the data being received. In this way, every bit is sampled at the fifty percent interval point. When the next start bit is detected, the clock is reset to synchronize the timing and the sampling process is repeated. Because of this oversampling technique, the advantage of the asynchronous mode of data transmission is that the receiver clock speed can be a few percent apart from the transmitter clock without any degradation of the error rate.

Data terminal equipment (DTE) usually interfaces to the world outside itself through the use of a circuit known as a USART—Universal Synchronous Asynchronous Receiver Transmitter or simply UART in the case of asynchronous transmission. This circuit is driven by a local clock and provides format conversion between the equipment it forms a part of and the transmission facility it is connected to.

In the conventional transmissin system a DTE is connected to another DTE through the use of analog modems. Because of the oversampling technique discussed above, the pair of DTEs can communicate virtually error free as long as their local clocks are within predetermined tolerances.

The telephone network has now evolved to the point where numerous digital switching facilities are connected in the system. These may be interconnected without the use of analog modems to form a fully digital network having various DTEs linked together via high speed digital transmission paths. Such networks are susceptible to errors in block mode transmission caused by variations between clocks driving different UARTs of the system.

In a digital network, a DTE is connected to a digital transmission facility via a data unit. Each data unit and each DTE has a UART driven by a local clock. Basically, a data unit ensures format and protocol compatibility with the digital transmission facility and as such acts like a repeater. Under these circumstances, and in view of the oversampling technique used in its UART, a data unit can receive asynchronous data even if its local clock is slightly different from that of the DTE transmitting the data. However, the data unit receiving a data stream at a speed higher than its own local clock speed is incapable of retransmitting the data to its associated DTE as quickly as it is being received. This results in an error rate that is proportional to the difference by which the rate of the received data exceeds the clock rate of the transmitter. Of course, if the received data rate is lower or equal to that of the transmitter clock rate, no problem exists.

The rate adaptation problem with digital asynchronous data transmission systems is usually solved by adjusting the nominal frequency of the transmitting clock of the data unit to its maximum permissible limit. This has the effect of shortening the period of each bit being transmitted with the ensuing penalty that the margin of error of the transmission system is reduced.

The invention provides a solution to the rate adaptation problem without causing continuous distortion of the data. In accordance with the invention, there is provided a circuit and a method for causing a data unit to adapt to a received data rate that is higher than nominal by increasing the frequency of the transmitting clock only to that extent necessary.

In accordance with the invention, there is provided a circuit and a method for causing a data unit to adapt to a received data rate that is higher than nominal. This is achieved by providing the UART of the data unit with a dynamically variable clock. When the microprocessor of the data unit determines that the received data is at a rate above nominal, the local clock rate is increased to compensate. At the end of each byte, the clock is reset. The procedure is repeated until it becomes unnecessary, that is, until data is being received at the nominal rate. Basically, the result of this technique is to effectively distort or shorten the last bit(s) of a byte, and then only when necessary. The clock rate can be increased to a rate corresponding to just slightly less than half the width of the stop bit so that it maybe correctly received at the DTE. For a ten bit byte, this maximum range adjustment corresponds to about five percent of the nominal clock rate.

An example embodiment of the invention will now be described in conjunction with the drawings, in which.

Figure 1:
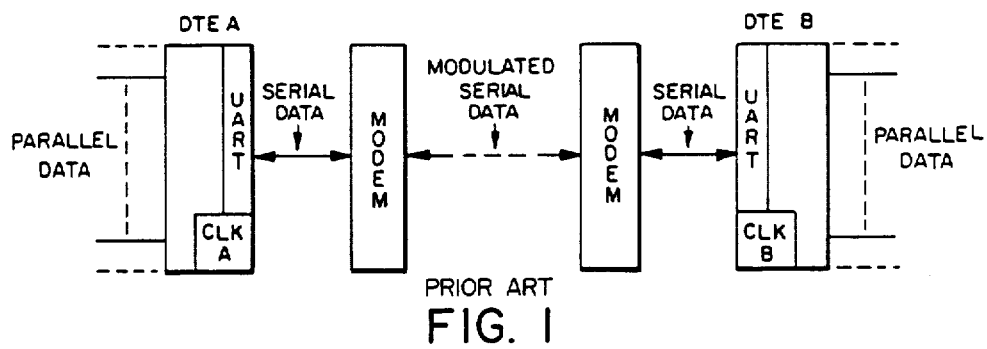
FIG. 1 shows a conventional configuration of a data transmission system using analog modems.

FIG. 1 illustrates a conventional configuration for the transmission of asynchronous data between data terminal equipment (DTE) A and DTE B. Each DTE comprises a respective UART driven from a local clock set at a nominal frequency to transmit data at a predetermined baud rate. The data output from each UART is fed to a respective modulator-demodulator circuit (MODEM) which converts its received digital data into modulated data, for example frequency shift keying, for transmission on the transmission facility. With this type of system, clocks A and B do not require to be phase or frequency locked. The instantaneous data rate of DTE A can vary from that of DTE B by as much as a few percent without any degradation of the error rate because the receiver section of each UART over-samples the incoming serial data, and resynchronizes to the start bit of each byte as it comes in.

Figure 2:
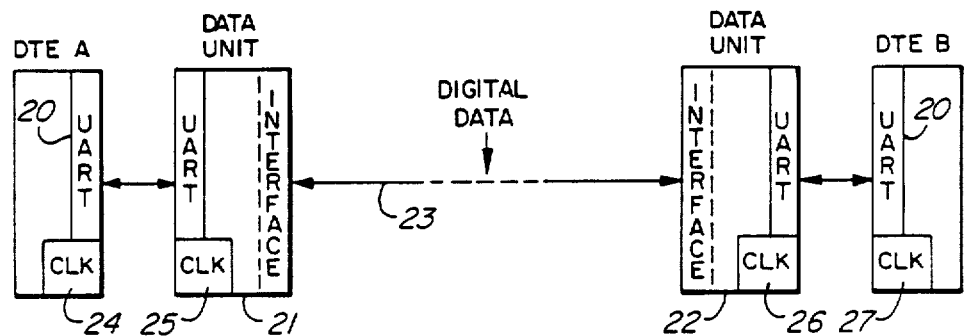
FIG. 2 illustrates a configuration for a fully digital, asynchronous data transmission system adapted to operate in accordance with the invention.

As mentioned above, it is becoming more and more common to use a fully digital system for the transmission of data. That is, a transmission facility interfaces to DTEs through the use of data units instead of MODEMS. Each data unit is a microprocessor-based data set that is adapted to convert the data received from the transmission facility which may, for example, be time compression multiplexed data, to RS232 data for use by DTEs. FIG. 2 shows a data system configuration for the transmission of fully digital asynchronous data. Each of DTE A and DTE B comprises a UART 20 for communicating with respective data units 21 and 22. Each data unit must be provided with an interface circuit to a transmission facility and with a UART for interfacing to its respective DTE. Each of the DTE A and B and of the data units 21 and 22 must also each include local clock systems, 24, 25, 26 and 27, to drive their respective UART. In order for the system to operate properly, these four clock systems must all operate to generate signals at the predetermined nominal rate. However, some clocks are less precise than others and often result in small variations. As mentioned above, a data unit can receive asynchronous data even if its local clock is slightly different from that of the DTE transmitting the data; however, it is not capable of retransmitting data to its associated DTE at a rate faster than that of the local clock. For example, a data unit receiving data at a rate of 1210 bauds cannot retransmit the data error free if its local baud rate generator is providing clock signals at the 1200 baud rate.

Figure 3:
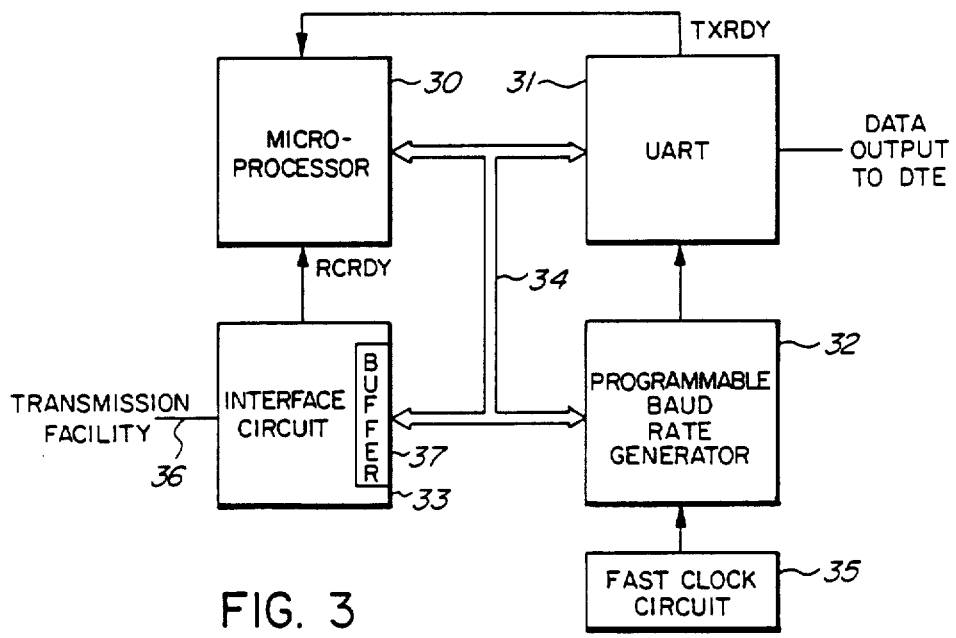
FIG. 3 is a block schematic diagram of the portion of a data unit shown in FIG. 2.

FIG. 3 illustrates the portion of a data unit necessary to realize the invention. A microprocessor 30 is connected to a UART 31, a programmable baud rate generator 32 and an interface circuit 33 via a data bus 34. All of these components may be obtained on an off-the-shelf basis from semiconductor component manufacturers. For example, the processor 30 may be an Intel device model number 8031 which is labelled a single component 8-bit microcomputer; the UART may be Intel component number 8251 and the programmable baud rate generator may be Intel component number 8253. The latter is conventionally used in instances where the data unit may be required to operate at selectable data rates, for example 1200, 9600 or 19.2K bauds. A particular rate may be selected as a result of a handshaking procedure between various units of the transmission system and it remains at that rate for the duration of a particular transmission. These components and their application are discussed in detail in the manufacturer's handbook for these components.

The generator 32 comprises a plurality of counters which are driven by a fast clock oscillator circuit 35 which may also be an off-the-shelf item. The generator 32 is programmable by a control word received from the processor 30 on bus 34. The interface circuit 33 may be any circuit which is adapted to accommodate the format and protocol of the data on the transmission facility 36. In this instance, the circuit 33 may be a device similar to UART 31.

Figure 4A:
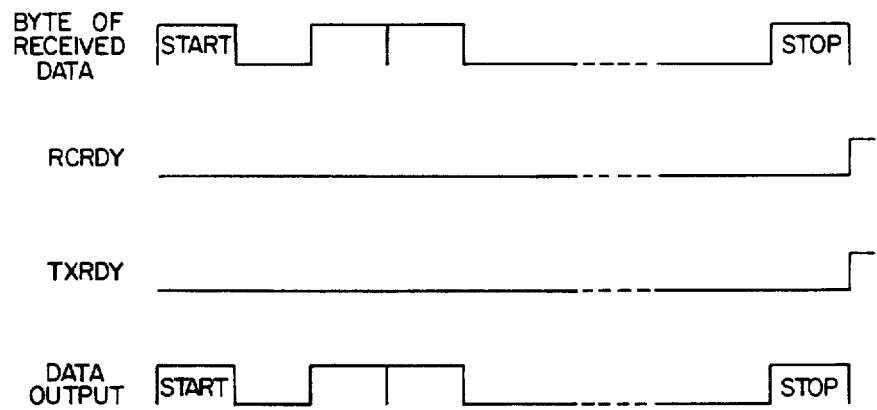
FIGS. 4A and 4B are diagrams of waveforms illustrating the operation of the circuit of FIG. 3.
Figure 4B:
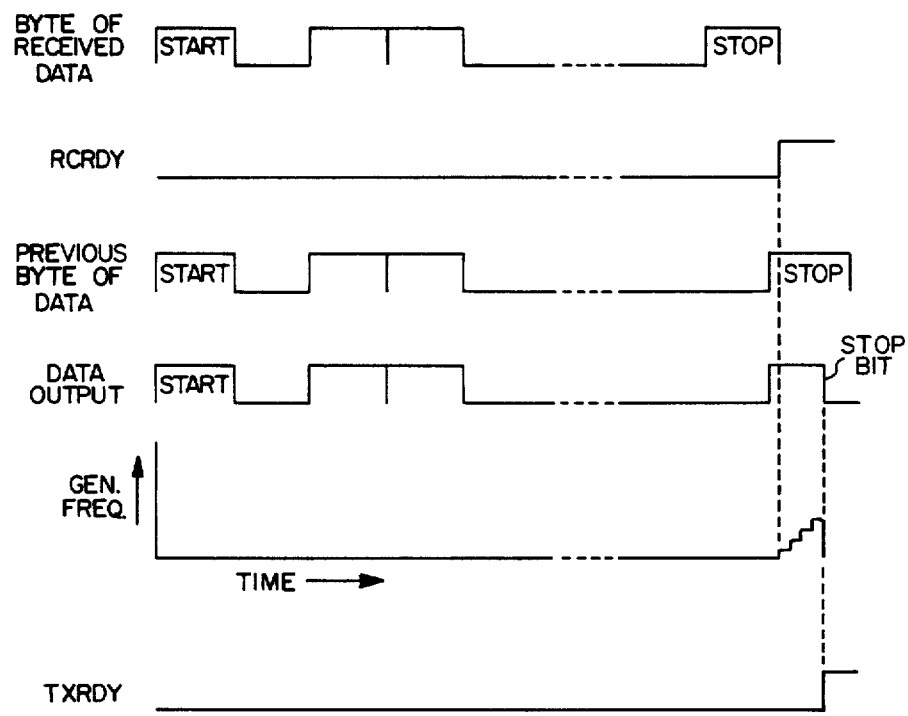
Figure 5:
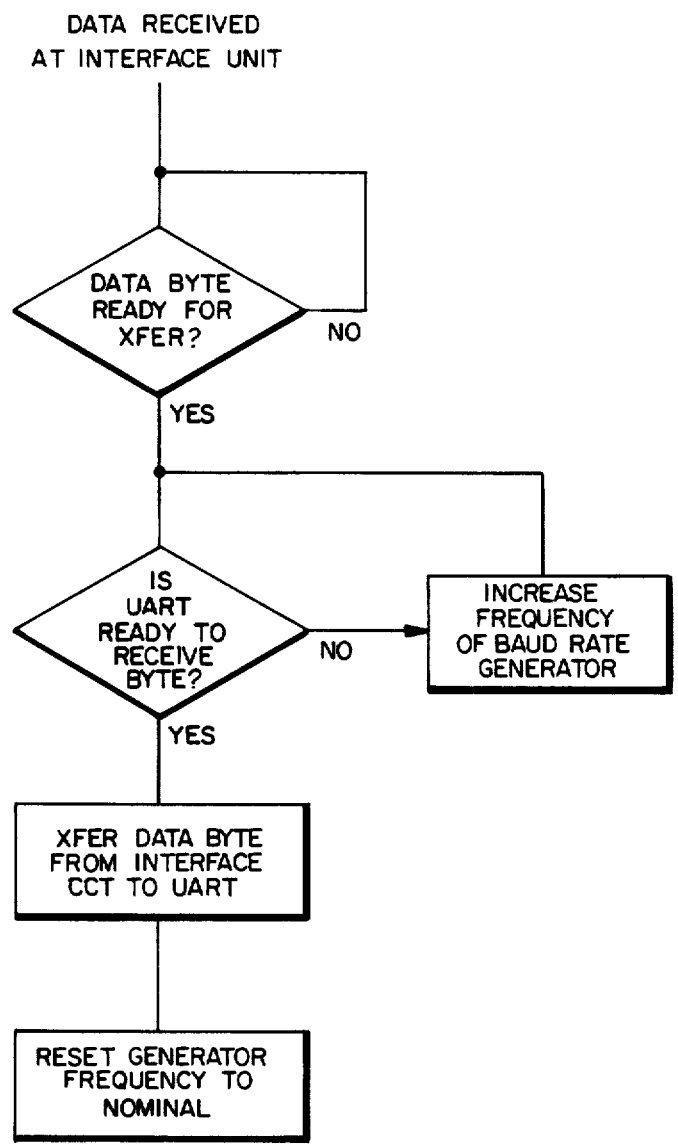
FIG. 5 is a flowchart diagram illustrating the operation of the circuit of FIG. 3.

The operation of the circuit may be better understood by reference to FIGS. 4A, 4B and 5 in conjunction with FIG. 3. The data on the transmission facility 36 is received at the interface circuit 33 and decoded to provide a byte of data in a buffer 37. The lead RCRDY informs the processor 30 that a byte of data is available for transfer to the output UART 31. The processor 30 monitors the status of lead TXRDY to determine if the UART 31 is ready to receive a byte of data from the bus 34. If the answer is yes, the byte of data in the buffer 37 is transferred to UART 31 via bus 34. The UART 31 converts the data to whatever is required by the DTE it is connected to, for example RS232 format. As shown in FIG. 4A, the data output is not distorted if TXRDY is coincident with or occurs before RCRDY; that is if the received data rate is not greater than the transmitter clock rate. On the other hand, if the lead RCRDY informs the processor 30 that a byte of data is ready for transfer to the UART 31 but the TXRDY lead indicates that the UART 31 is still processing the previous byte of data, the processor 30 reacts by instructing the generator 32, via the bus 34, to increase its rate in order to accelerate the transmission of the previous byte of data from the UART 31 to the DTE. In order for the DTE to be able to correctly receive the byte of data being transmitted by the UART 31, it must be able to recognize the stop bit. Therefore, the distortion of the data resulting from the accelerated transmission must not result in the outputting of a stop bit which is less than fifty percent of the normal period at the normal frequency of the receiving UART in the DTE.

This result may be achieved by doubling the frequency of the baud rate generator as soon as the beginning of the stop bit is detected. However, this entails the counting and recognition of the bits at the output of the UART 31 and thus results in an increased load on the processor 30.

The preferred technique for adjusting the frequency of the baud rate generator is illustrated in FIG. 4B. The status of the TXRDY lead is monitored on a periodic basis by the processor 30 as soon as the RCRDY signal has indicated that a new byte of data is ready for transfer to the UART 31. For example, in the case of a transmission rate of 1200 baud and a monitoring period of 125 microseconds, the TXRDY lead would be sampled slightly more often than six times during each bit interval. Therefore, each time that the TXRDY lead is sampled and indicates that the UART 31 is not ready to accept the next byte, the frequency of the baud rate generator 32 is increased by a predetermined increment. This procedure is repeated until the TXRDY signal is activated to indicate that the previous byte of data has been fully transmitted and that the UART 31 is ready to receive the next byte of data from the buffer 37 via the bus 34. Following this data transfer, the baud rate generator 32 is reset to the predetermined nominal frequency as illustrated by the waveforms of FIG. 4B.

The data output waveform of FIG. 4B shows that the effect of increasing the frequency of the baud rate generator 32 until TXRDY is activated is to shorten the width of the stop bit. If the difference in rate between the received data and the nominal frequency of the baud rate generator 32 is large enough, it is entirely possible that other(s) than the stop bit will be distorted. However, since the frequency increase is incremental, the distortion of the bits will be progressive. That is, the stop bit will be affected the most. Hence, if the amount of the frequency increase is controlled to be an amount corresponding to an interval reduction of the stop bit that is less than fifty percent of its width at the nominal frequency of the generator, the DTE receiving the data will be capable of recognizing it. In a ten-bit byte, this amount corresponds to a rate adaptation of at least five percent. The following equation provides a useful criterion for determining the amount of frequency variation for each increment of adjustment:

$$n/m \approx K$$

where n is the interval for sampling the TXRDY indicator expressed as a fraction of a nominal bit period; m is the increment by which the frequency is increased expressed as a fraction of the nominal frequency of the baud rate generator, and K is a constant. A value of fifteen for K has been found to provide effective operation of the circuit; however, the constraints are not particularly restrictive. For a 1200 baud system, n=about 1/6 and m=about 1/90 which corresponds to a frequency increment of about 13 hertz or approximately one percent per increment.

Although the invention has been described in terms of its effect on the stop bit, it should be noted that rate adaptation to overspeed data may be realized by shortening any of the bits in a byte of data.

The rate adaptation range provided by the circuit and method of the invention is large by comparison to the percentage deviation from preset nominal frequency that is conventionally allowed between the baud rate generators of a transmission system. Therefore, the invention provides an effective solution to the problem of bloc mode transmission of asynchronous data in fully digital transmission systems.

What is claimed is:

1. In a digital system for transmitting synchronous digital data information, a data unit for interfacing a digital transmission facility to data terminal equipment, the data unit comprising: an interface circuit for receiving consecutive bytes of data from the digital transmission facility, a universal asynchronous receive transmit circuit (UART) having its output terminal connected to data terminal equipment, a dynamically adjustable baud rate generator for driving the UART, a microprocessor, and a bus interconnecting the microprocessor, the interface circuit, the UART, and the generator, the microprocessor being programmed for controlling the transfer of data received from the transmission facility to the output terminal of the UART and being responsive to the condition that the rate of the data being received from the transmission facility is greater than the nominal frequency of said baud rate generator for increasing the frequency thereof by an amount not exceeding a frequency corresponding to slightly less than one-half the duration of a stop bit at said nominal frequency.

2. A data unit as defined in claim 1 wherein the microprocessor is responsive to a boundary between the bytes of data being outputted from the UART to the data terminal equipment for resetting the baud rate generator to its nominal frequency.

3. In a digital system for transmitting asynchronous digital data information, a data unit for interfacing a digital transmission facility to data terminal equipment, the data unit comprising: an interface circuit for receiving consecutive bytes of data from the digital transmission facility, a universal asynchronous receive transmit circuit (UART) having its output terminal connected to data terminal equipment, a dynamically adjustable baud rate generator for driving said UART, a microprocessor, and a bus interconnecting the microprocessor, the interface circuit, the UART, and the generator, the microprocessor being programmed for controlling the transfer of data received from the transmission facility to the output terminal of the UART, the microprocessor being responsive to a first signal from the UART for transferring a byte of data received at the interface circuit to the UART and being responsive to a second signal for increasing the frequency of the baud rate generator until said first signal is received.

4. A data unit as defined in claim 3 wherein the first signal from the UART to the microprocessor represents an indication that it is ready to receive the next byte of data from the interface circuit and the second signal represents an indication that a byte of data is available for transfer from the interface circuit to the UART but that the first signal has not been received by the microprocessor.

5. A data unit as defined in claim 4 wherein the maximum increase in the frequency of the rate generator corresponds to slightly less than one-half the duration of a stop bit at the nominal frequency of the baud rate generator.

6. A data unit as defined in claim 5 wherein the baud rate generator is reset to its nominal frequency at the boundary of each byte of data outputted from the UART.

7. In a digital system for transmitting asynchronous bloc mode digital data information, a data unit for interfacing a digital transmission facility to data terminal equipment, the data unit comprising: an interface circuit for receiving consecutive bytes of data from the digital transmission facility, a universal asynchronous receive transmit circuit (UART) having its output terminal connected to data terminal equipment, a dynamically adjustable baud rate generator for driving said UART, a microprocessor, and a bus interconnecting the microprocessor, the interface circuit, the UART, and the generator, the microprocessor being programmed for controlling the transfer of data received from the transmission facility to the output terminal of the UART, the microprocessor being responsive to a first signal indicating that the interface circuit has a byte of data ready for transfer and to a second signal indicating that the UART is ready to receive a byte of data for transferring said byte of data from the interface circuit to the UART, the microprocessor being also responsive to the first signal and to the absence of the second signal for periodically sampling the UART at a predetermined rate until said second signal is detected, the microprocessor being responsive to each negative response from the sampling operation for increasing the frequency of the baud rate generator by a predetermined amount.

8. A data unit as defined in claim 7 wherein the maximum increase in frequency of the baud rate generator does not result in the stop bit of the byte being outputted from the UART having a duration corresponding to less than fifty percent of the period of a stop bit at the nominal frequency of the baud rate generator.

9. A data unit as defined in claim 8 wherein the baud rate generator is reset to its nominal frequency at a boundary between each byte of data outputted from the UART.

10. A method of rate adaptation in a fully digital system for the bloc mode transmission of asynchronous data comprising a data unit for interfacing a digital transmission facility to data terminal equipment, the data unit comprising an interface circuit for receiving consecutive bytes of data from the transmission facility, a universal asynchronous receive transmit circuit (UART) having its output terminal connected to data terminal equipment, a dynamically adjustable baud rate generator for driving the UART, a microprocessor, and a bus interconnecting the microprocessor, the interface circuit, the UART, and the generator, the microprocessor being programmed for controlling the transfer of data received from the transmission facility ot the output terminal of the UART, the method comprising the steps of:

detecting that the data received on the transmission facility is at a rate higher than that corresponding to the nominal frequency of the rate generator;

increasing the frequency of the baud rate generator by an amount which results in the stop bit of the byte being processed by the UART having a shortened period which is not less than fifty percent of that of a stop bit at the nominal frequency; and resetting the baud rate generator to its nominal frequency at the boundary of each byte of data outputted by the UART.

11. A method of rate adaptation in a fully digital system for the bloc mode transmission of asynchronous data comprising a data unit for interfacing a digital transmission facility to data terminal equipment, the data unit comprising an interface circuit for receiving consecutive bytes of data from the digital transmission facility, a universal asynchronous receive transmit circuit (UART) having its output terminal connected to data terminal equipment, a dynamically adjustable baud rate generator for driving the UART, a microprocessor, and a bus interconnecting the microprocessor, the interface circuit, the UART, and the generator, the microprocessor being programmed for controlling the transfer of data received from the transmission facility to the output terminal of the UART, the method comprising the steps of:

generating a first signal when the interface circuit is ready for the transfer of a byte of data to the UART;

monitoring the presence of a second signal indicative that the UART is ready to receive the next byte of data from the interface circuit and upon the absence of the second signal, periodically sampling the UART at a predetermined rate until said second signal is detected and, for each negative response of the sampling operation, increasing the frequency of the baud rate generator by a predetermined amount; and resetting the baud rate generator to its nominal frequency at the boundary of each byte of data transmitted from the UART to the data terminal equipment.

12. A method of rate adaptation as defined in claim 11 wherein the maximum increase in frequency of the baud rate generator does not result in the stop bit of the byte being outputted from the UART having a duration corresponding to less than fifty percent of the period of a stop bit at the nominal frequency of the baud rate generator.

13. A method of rate adaptation in a fully digital system for the bloc mode transmission of asynchronous data comprising a data unit for interfacing a digital transmission facility to data terminal equipment, the data unit comprising an interface circuit for receiving consecutive bytes of data from the transmission facility, a universal asynchronous receive transmit circuit (UART) having its output terminal connected to data terminal equipment, a dynamically adjustable baud rate generator for driving the UART, a microprocessor, and a bus interconnecting the microprocessor, the interface circuit, the UART, and the generator, the microprocessor being programmed for controlling the transfer of data received from the transmission facility to the output terminal of the UART, the method comprising the steps of:

detecting that the data received on the transmission facility is at a rate higher than that corresponding to the nominal frequency of the rate generator;

increasing the frequency of the baud rate generator by an amount which results in one or more bit(s) of the byte of data being processed by the UART having a shortened period that is not less than fifty percent of the same bit(s) at the nominal frequency; and resetting the baud rate generator to its nominal frequency at the boundary of each byte of data outputted by the UART.

* * * * *